United States Patent [19]
Hu et al.

[11] Patent Number: 5,400,377
[45] Date of Patent: Mar. 21, 1995

[54] ARTIFACT REDUCTION METHOD FOR TOMOGRAPHIC IMAGE RECONSTRUCTION USING CROSS-PLANE RAYS

[75] Inventors: Hui Hu, Waukesha; Robert D. Nowak, Greendale, both of Wis.

[73] Assignee: General Electric Company, Milwaukee, Wis.

[21] Appl. No.: 93,108

[22] Filed: Jul. 16, 1993

[51] Int. Cl.⁶ ......................................... G01N 23/083
[52] U.S. Cl. ........................................ 378/8; 378/19; 378/901; 364/413.14
[58] Field of Search ............................ 378/4, 8, 19, 99; 364/413.13, 413.14, 413.23

[56] References Cited

U.S. PATENT DOCUMENTS 5,170,439 12/1992 Zeng et al. ........................... 382/6
5,345,513 9/1994 Taheda et al. ........................ 382/6

OTHER PUBLICATIONS

*Practical cone-beam algorithm*, Feldkamp, Davis and Kress, J. Opt. Soc. Am. A/vol. 1, No. 6, Jun. 1984, pp. 612–619.

Primary Examiner—Paul M. Dzierzynski
Assistant Examiner—David Vernon Bruce
Attorney, Agent, or Firm—Quarles & Brady

[57] ABSTRACT

A cone beam scanning apparatus reduces image artifacts incident to cone beam geometry by decomposing an acquired image into soft tissue and bone and air images based on the density of the pixels in that image. The soft tissue image is filtered to remove frequency space data corresponding to zones of incomplete frequency space data in the original projection image to remove the generated artifacts.

14 Claims, 6 Drawing Sheets

ARTIFACT REDUCTION METHOD FOR TOMOGRAPHIC IMAGE RECONSTRUCTION USING CROSS-PLANE RAYS

FIELD OF THE INVENTION

This invention relates to computed tomography (CT) and other similar projection imaging systems and specifically to such systems in which projections of the imaged object are taken both along rays within a gantry plane and rays crossing the gantry plane.

BACKGROUND OF THE INVENTION

Fan Beam CT

In a typical computed tomography system, an x-ray source, mounted to a rotating gantry, is collimated to form a fan beam with a defined fan beam angle. The fan beam is typically oriented to lie within the "gantry plane" normal to the axis of rotation of the gantry, and is transmitted through an imaged object to an x-ray detector array also oriented within the gantry plane. The axis of rotation of the gantry is also referred to as the z-axis, The detector array is comprised of a line of detector elements, each of which measures the intensity of transmitted radiation along a ray projected from the x-ray source to the particular detector element. The intensity of the transmitted radiation is dependent on the attenuation of the x-ray beam along that ray by the imaged object.

The x-ray source and detector array may be rotated on the gantry within the gantry plane and around a center of rotation so that the "gantry angle" at which the fan beam axis intersects the imaged object may be changed. At each gantry angle, a projection is acquired comprised of the collected intensity signals from each detector element. The gantry is then rotated to a new angle and the process is repeated to collect projections data along a number of gantry angles to form a tomographic projection set.

Often, $2\tau$ radians or 360° of gantry rotation will be used to collect the projection set; however, for fan beam CT systems, it has been determined that a mathematically complete projection set may be obtained with as little as $\tau$ radians, plus the angle of the fan beam of gantry rotation. The use of less than $2\tau$ radians of gantry rotation to collect a projection set will be referred to generally as "half scan".

The acquired tomographic projection sets are typically stored in numerical form for later computer processing to "reconstruct" a slice image according to reconstruction algorithms known in the art. A projection set of fan beam projections may be reconstructed directly into an image by means of fan beam reconstruction techniques, or the intensity data of the projections may be sorted into parallel beams and reconstructed according to parallel beam reconstruction techniques. The reconstructed tomographic images may be displayed on a conventional CRT tube or may be converted to a film record by means of a computer controlled camera.

A typical computed tomographic study involves the acquisition of a series of "slices" of an imaged object, each slice parallel to the gantry plane and having a slice thickness dictated by the size of the focal spot, the width of the detector array, the collimation, and the geometry of the system. Each successive slice is displaced incrementally along a z-axis, perpendicular to the x and y axes, so as to provide a third spatial dimension of information. A radiologist may visualize this third dimension by viewing the slice images in order of position along the z-axis. Alternatively, the numerical data comprising the set of slices can be processed further by computer to produce slice images at any orientation through the image object or to produce three dimension perspective representations of the image object.

Cone Beam CT

As the resolving power of computed tomography methods increases, a growing number of slices are required in the z-dimension. The time and expense of a tomographic study increases with the number of sequential slices required. Also, the longer scan time needed to acquire more slices increases the discomfort to the patient who must remain nearly motionless during that time to preserve the fidelity of the tomographic reconstructions. Accordingly, there is considerable interest in reducing the time required to obtain a slice series.

One method of decreasing the scanning time needed to collect multiple slices of data is to acquire projection data for more than one slice during a given gantry rotation. This may be done by using a two-dimensional detector array extending along the z-axis to obtain projection data on either side of the gantry plane, and by changing the collimation of the x-rays from that of a fan beam to, for example, a cone beam having rays diverging from a focal spot not only within the gantry plane but to either side of the gantry plane as well. It will be recognized that such a cone beam generally need not be a true cone but may also include, for example, pyramidal dispersions of x-rays in three dimensions. The collection of radiation from more than a single plane during one projection will be referred to generally as three dimensional scanning.

Cone beam reconstruction techniques are known in the art. One such technique is described in the paper: "Practical cone-beam algorithm" by L. A. Feldkamp, et al. J. Opt. Soc. Am. A/Vol. 1, No. 6, (June 1984) hereby incorporated by reference.

Despite the potential advantages of three-dimensional scanning, the images are frequently degraded by artifacts which obscure structures within the imaged object.

SUMMARY OF THE INVENTION

The present invention is a method and apparatus for reducing artifacts caused by cone beam reconstruction techniques. The present invention recognizes that a class of such artifacts are caused by missing projection data bounded by conical zones in the frequency space representation of such data. Based on prior knowledge about the type of objects to be imaged, the source of the artifacts identified and compensated for within the spatial domain and images are filtered in the Fourier domain.

Specifically, in the present invention, projection data is acquired in a cone beam scan and reconstructed by cone beam reconstruction techniques to produce a first tomographic image having pixels representing varying densities of the imaged object. Because of the geometry of the cone beam scanning, the projection data is missing data in certain zones of its frequency space representation.

The first tomographic image reconstructed from this projection data is separated into two images, one a mid-range density image having pixels with density values within a predetermined range, the second an extreme-range density image including pixels having density values outside of the predetermined range. In the example of imaging of the human body, the mid-range image may be soft tissue and the extreme-range image may be bone and air.

The mid-range density image is filtered to reduce its spatial frequencies corresponding to the zones of missing frequency space data. This mid-range image is then recombined with the extreme-range image to produce a second tomographic image having reduced image artifacts.

It is one object of the invention to isolate the portions of the frequency space representation of the projection data causing the artifacts in the first tomographic image. By making the assumptions that the artifacts shown in the soft tissue image are primarily caused by the pixels corresponding to bone and air, the areas of the artifact producing frequency space data may be identified in frequency space and largely eliminated by filtering.

The filtering is accomplished by transforming the mid-range image to produce frequency space data and attenuating the artifact producing frequency space data. Alternatively, the mid-range density image may be combined with the extreme-range density image, after the pixels of the extreme range density image have been multiplied by a negative factor between zero and negative one. The modified mid-range density image is then transformed to produce frequency space data and filtered as before.

By filtering the modified mid-range data, with extreme-range data multiplied by a small negative factor, new data components are generated which cancel with the undesired artifacts. Hence, the filtering of the modified mid-range data results in artifact cancellation in addition to artifact attenuation.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Cone Beam Scanning Hardware

Figure 1:
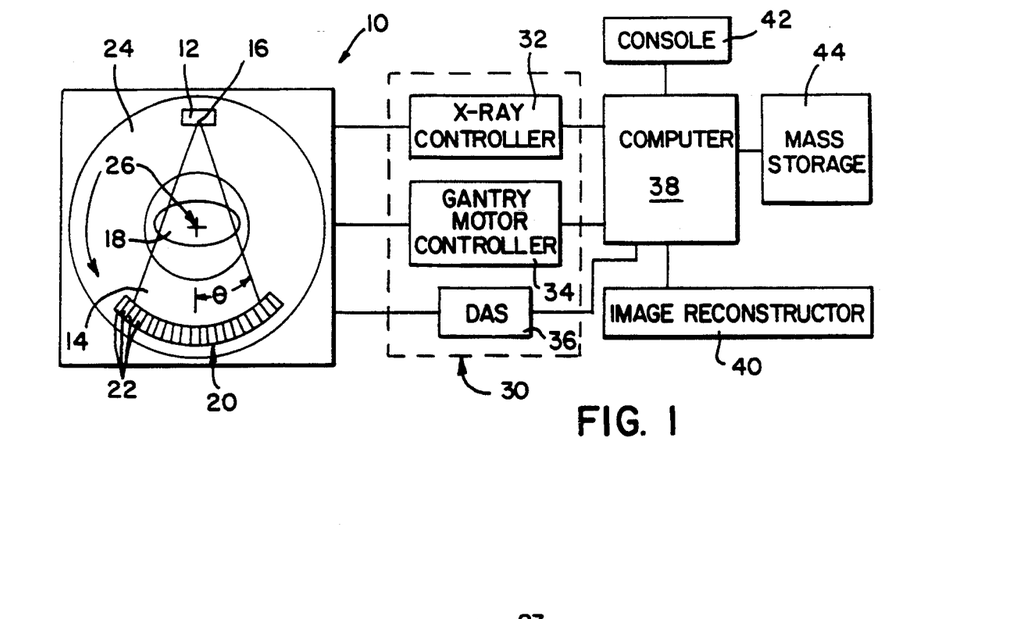
FIG. 1 is a simplified schematic representation of a CT system, as may be used with the present invention, including a gantry holding an x-ray source and x-ray detector for obtaining projections of a patient.
Figure 2:
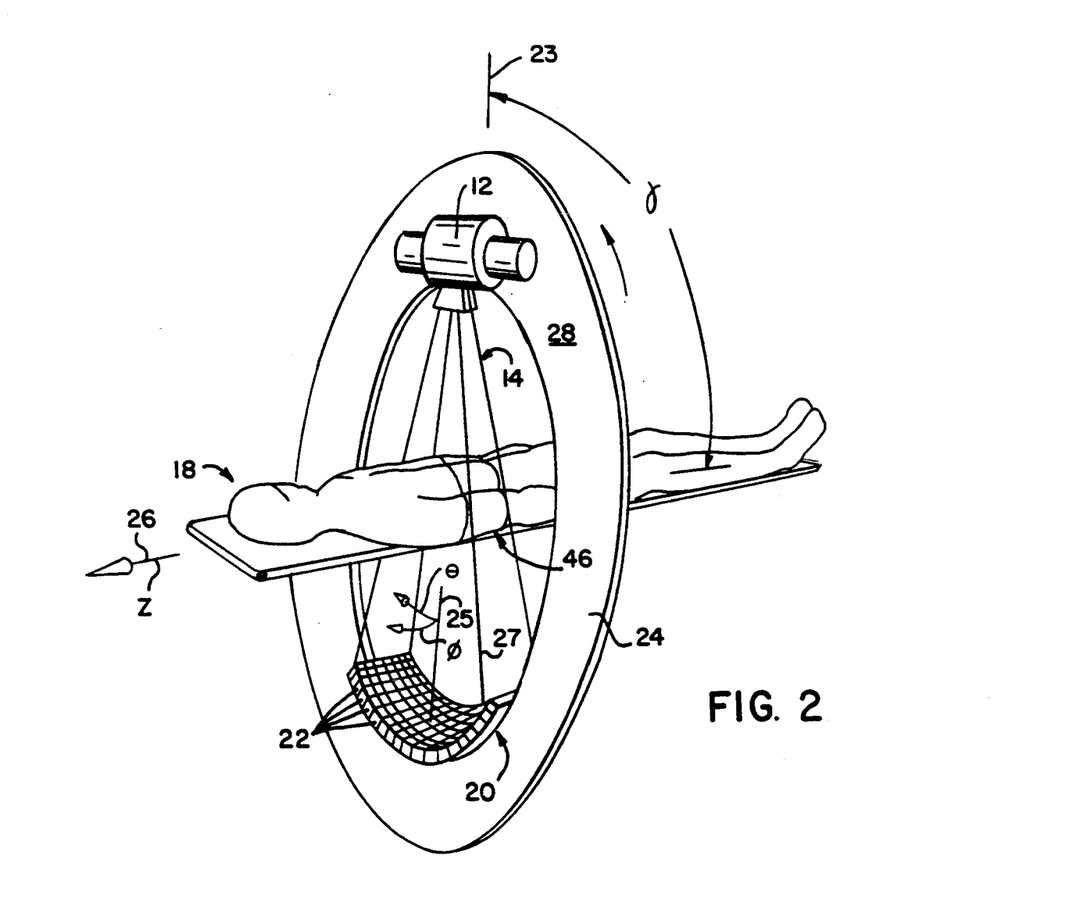
FIG. 2 is a simplified perspective view of the gantry of FIG. 1 showing a cone beam of x-rays from the x-rays source and a two-dimensional detector array suitable for three dimensional scanning.

Referring to FIGS. 1 and 2, a CT system 10 typical of a three-dimensional CT scanner includes an x-ray source 12 oriented to project a cone beam of x-rays 14 from a focal spot 16 through a patient 18 to be received by a two-dimensional detector array 20.

The two-dimensional detector array 20 includes a number of detector elements 22 arranged over the area of the detector array 22 in generally perpendicular columns and rows together to detect a projected image from the transmission of the x-rays 14 through the patient 18.

The x-ray source 12 and the two-dimensional detector array 20 are mounted on either side of a gantry 24 so as to rotate in opposition about an axis of rotation 26 generally positioned within the patient 18. The axis of rotation 26 forms the z-axis of a Cartesian coordinate system having its origin centered within the cone beam 14. The plane defined by the x and y axes of this coordinate system thus defines a plane of rotation, specifically the gantry plane 28 of the gantry 24.

Rotation of the gantry 24 is measured by angle $\gamma$ from an arbitrary reference position within the gantry plane 28. Angle $\gamma$ varies between 0 and $2\pi$ radians (360°). The x-rays of the cone beam 14 diverge from the gantry plane 28 by angle $\phi$ and diverge along the gantry plane 28 by angle $\theta$. Correspondingly, the two-dimensional detector array 20, is arranged generally but not limited to a section of the surface of a sphere having a center at the focal spot 16, and has its grid of detector elements 22 arranged so as to receive and make intensity measurements along the rays of the cone beam 14 throughout the angles of $\phi$ and $\theta$ of the cone beam 14. Rays 25 of the cone beam 14 having values of $\phi+0$, lie in the gantry plane 28 and will be termed "in-plane rays". The in-plane rays 25 are those rays used in conventional fan beam CT systems. Those rays 27 having values of $\phi \neq 0$ will be termed "cross-plane rays".

Referring to FIG. 1, the control system of the CT scanner 10 has gantry associated control modules 30 which include: x-ray controller 32, which provides power and timing signals to the x-ray source 12, gantry motor controller 34, which controls the rotational speed and position of the gantry 24, and data acquisition system (DAS) 36, which receives projection data from the two-dimensional detector array 20 and converts the data into digital words for later computer processing, preserving also the values of $\phi$, $\theta$ and the gantry angle $\gamma$ at which the data was taken. The x-ray controller 32, the gantry motor controller 34 and the data acquisition system 36 are connected to computer 38 for control by computer 38 and to transmit data to computer 38.

The computer 38 is a general purpose mini-computer and may be programmed to acquire and manipulate projection data per the present invention as will be described in detail below. The computer 38 is connected to an image reconstructor 40 which performs high speed image reconstruction according to methods known in the art.

The computer 38 receives commands and scanning parameters via operator console 42 which is generally a CRT display and keyboard which allow an operator to enter parameters for the CT scan and to display the reconstructed image or other information from computer 38. A mass storage device 44 provides a means for storing operating programs for the CT imaging system 10 as well as storing projection and image data for future reference by the operator.

Geometry of a Cone Beam Scan

Figure 3:
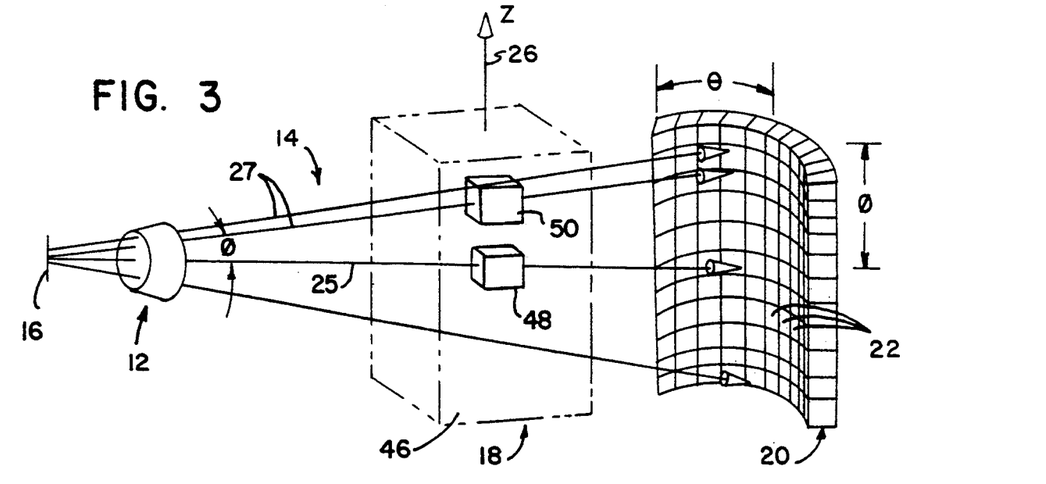
FIG. 3 is a geometric representation of a volume of the patient as illuminated by the cone beam of x-rays showing the parallelism of cross-plane rays for small subvolumes.

Referring to FIG. 3, for a given projection, the cone beam of x-rays 14 strikes a volume 46 of the patient 18. Within that volume 46, a first subvolume 48 receives in-plane rays 25 from the cone beam 14 having a $\phi$00 value of zero. These in-plane rays 25 are detected by the detector elements 22 of the two-dimensional detector array 20 within the gantry plane 28 (shown in FIG. 2) along a single row within the gantry plane 28.

A second subvolume 50, displaced along the z-axis from the first subvolume 48, receives cross-plane rays 27 having $\phi$ values not equal to zero. These cross-plane rays 27 are detected by other rows of detector elements 22 of the two-dimensional detector array 20, such rows not lying within the gantry plane 28. Provided subvolume 50 is small, the cross-plane rays 27 intercepting subvolume 50 are essentially parallel to each other.

Figure 4:
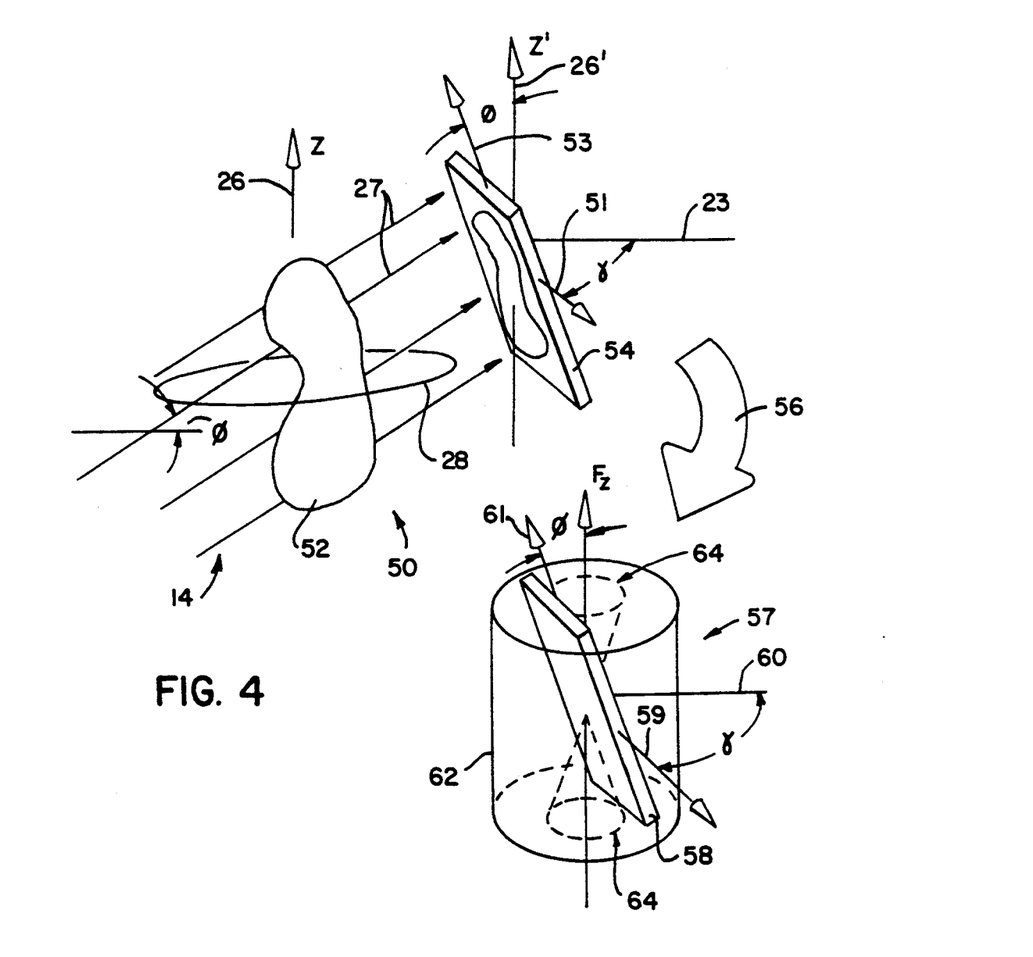
FIG. 4 is a diagrammatic representation of the *Three Dimensional Fourier Slice Theorem* showing the generation of frequency space data from multiple projections of cross-axis rays.

Referring to FIG. 4, during scanning, an object 52 within sub-volume 50 is illuminated by essentially parallel cross-plane rays 27 to create a parallel, two-dimensional projection 54. The plane of projection 54 is perpendicular to the cross-plane rays 27, i.e., the normal to the plane 54 is parallel to rays 27, and is centered on a Z'-axis 26' parallel to Z-axis 26.

The *Three Dimensional Fourier Slice Theorem* states that the two-dimensional Fourier transform of a two-dimensional parallel projection of an object provides a plane of values of three-dimensional Fourier transform of the object, where the normal to the plane of values in frequency space plane is parallel to the direction of the projection. Accordingly, the two-dimensional parallel projection 54, when operated on by a two-dimensional Fourier transform 56 provides a plane 58 of data in frequency space 57.

The two-dimensional projection 54 has a first axis 51 perpendicular to the Z'-axis 26' and a second axis 53 tipped with respect to the Z-'axis 26' by angle $\phi$ so as to receive the cross-plane rays 27 of the cone beam 14 perpendicularly to its surface. The first axis 51 of the two-dimensional projection 54 is rotated around the Z'-axis 26' by an amount $\gamma$ from reference angle 23 determined by the position of the gantry 24, as previously described.

Similarly, by the above theorem, the two-dimensional Fourier transform 56 of the two-dimensional projection 54 yields the values of the three-dimensional Fourier transform of the object 52 in frequency space 57 along a plane 58 having a first axis 59 rotated by angle $\gamma$ around perpendicular frequency space axis $F_z$ with respect to a reference 60, and a second axis 61 rotated by angle $\phi$ with respect to $F_z$. The axis $F_z$ is simply a Cartesian coordinate axis of frequency space 57 defined as corresponding to the Z-axis 26.

For different projections 54 obtained at different angles $\gamma$ by rotation of gantry 24, additional planes 58 of Fourier data will be obtained. Each plane 58 of Fourier data will have same angle $\phi$ with respect to $F_z$, as fixed by the angle $\phi$ of the cross-plane rays 27, but will be rotated around $F_z$ so as to sweep out a cylinder of data 62 in frequency space 56 excluding two conical areas 64. The excluded conical areas 64 are cones having bases abutting the bases of the cylinder 62 and vertices meeting at the centerpoint of cylinder 62. The vertex angle of these conical areas 64 is equal to $2\phi$, and thus the conical areas grow larger as the $\phi$ value of the cross-plane rays 27 increases.

The cylinder 62 and the cones 64 bound the data obtained in frequency space for projections 54 taken at angles of $\gamma$ ranging over $2\pi$ radians during rotation of the gantry 24.

Referring to FIG. 3, in a cone beam, the angle $\phi$ a given volume element 50 will vary as the volume element is displaced along the z-axis. Accordingly the cone of missing data 64 will have a vertex angle that is progressively greater as the volume element 50 moves away from the gantry plane 28. Nevertheless, the missing data 64 of the entire projection set for the volume 46 may be approximated as a single conical area having an apex angle between 0 and twice the maximum value of $\phi$ in the cone beam 14.

Referring again to FIG. 4, reconstruction of an image of the object 52 requires taking the inverse Fourier transform of the data of cylinder 62. Generally this inverse Fourier transform is taken along a single plane at a time through cylinder 62 so as to produce a tomographic or slice image. The effect of the missing data of the conical areas 64 on the reconstructed image is to eliminate spatial frequencies that are high in Fz but low in Fx and Fy from the reconstructed image for slices above and below the gantry plane 28. It can be shown that cone beam reconstruction techniques assume that the data in the missing data cones 64 are zero.

Reduction of Cone Beam Artifacts

Figure 5:
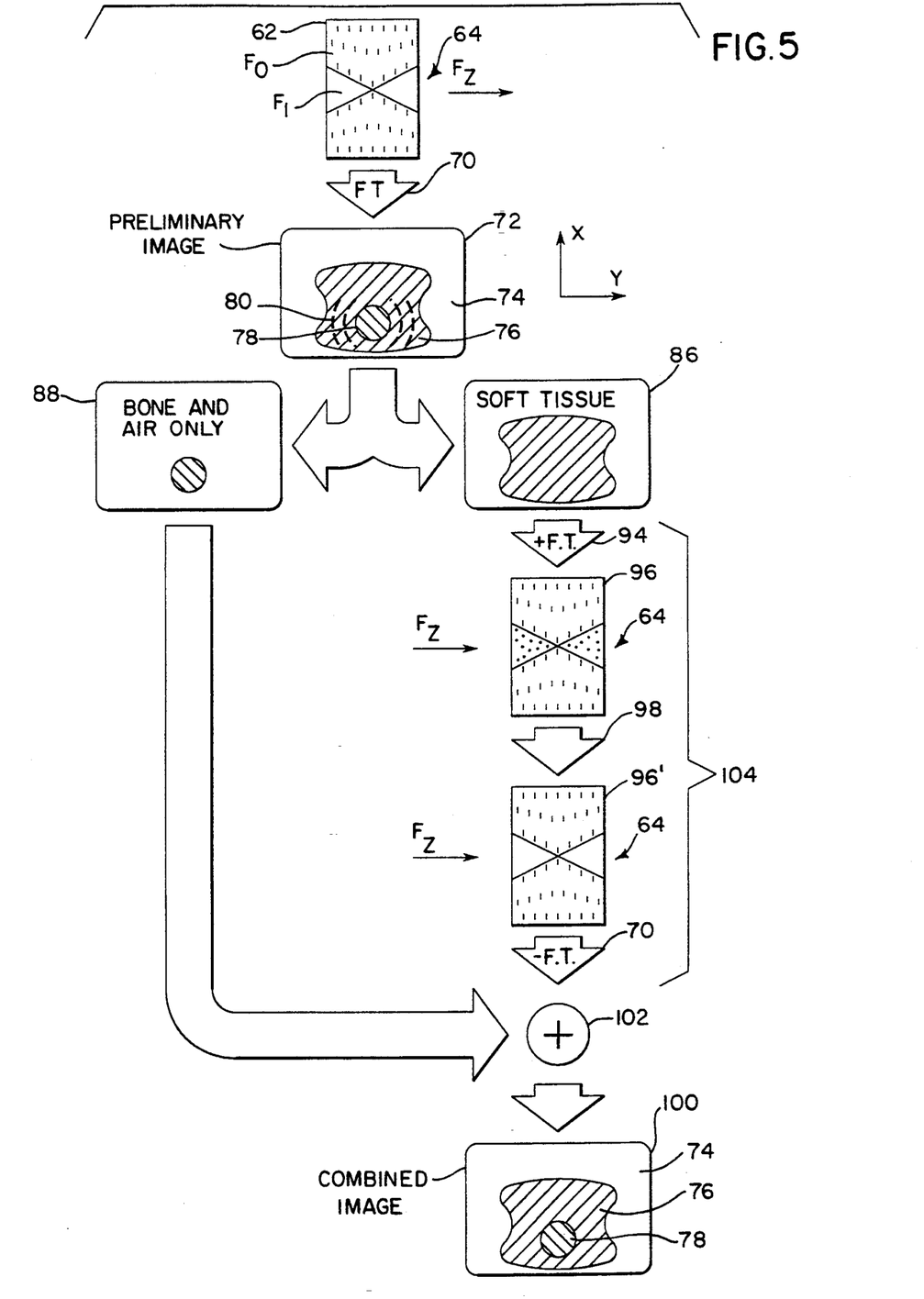
FIG. 5 is a pictorial representation of the artifact attenuation process showing first the image decomposed into mid and extreme range images and next, the mid-range image transformed into a frequency space representation and filtered, and finally, the filtered mid-range image recombined with the extreme-range image.

Referring now to FIG. 5, the acquired conical projection set data provides frequency space data 62 having conical area 64 of missing frequency space data. The Fourier transform 70 of this frequency space data 62 provides a preliminary image 72 having pixels representing air 74, soft tissue 76, bone 78 and image artifacts 80.

Figure 6:
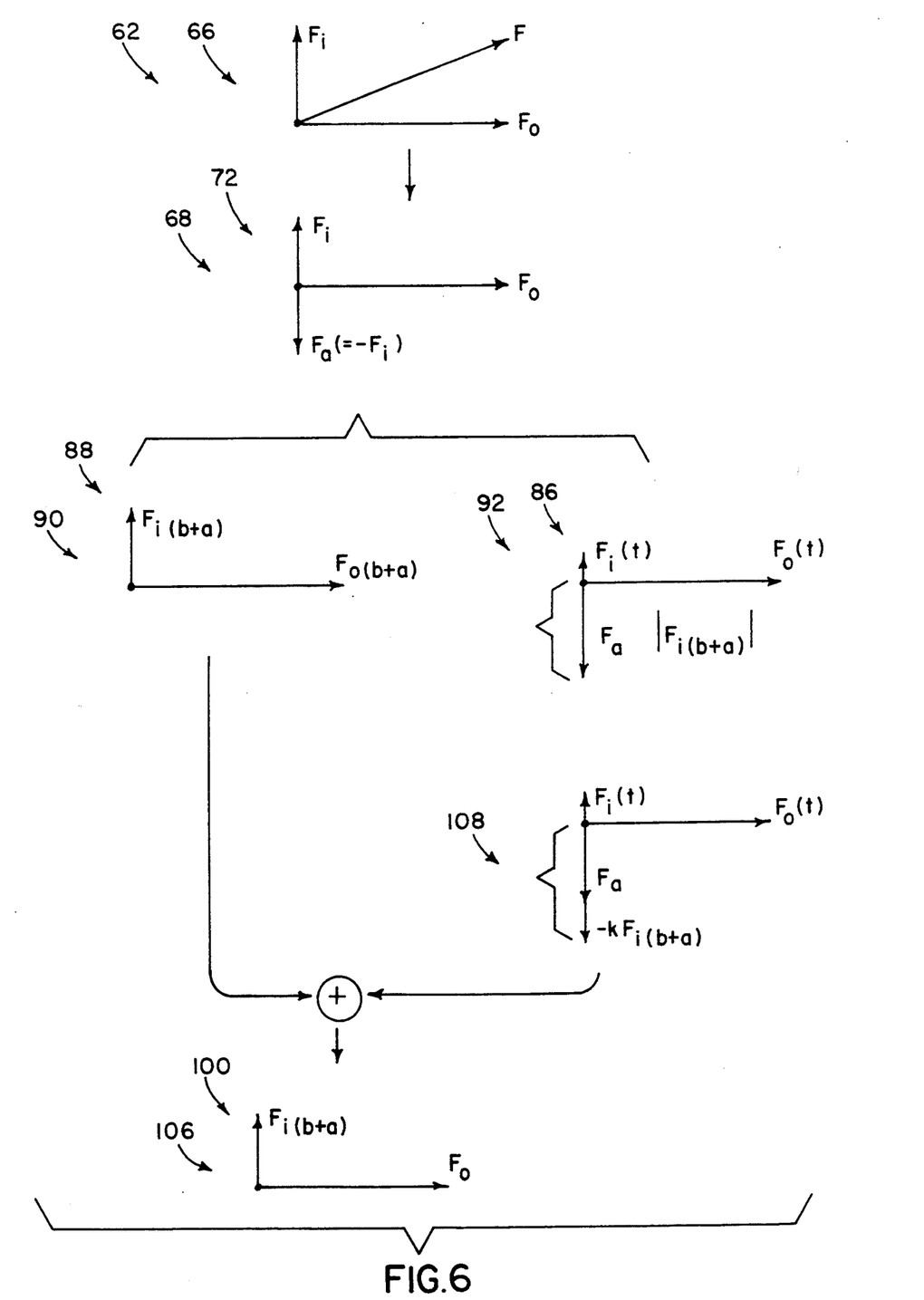
FIG. 6 is a set of vector representations of the frequency space data of the imaged object in various stages of the processing per the present invention.

Referring to FIG. 6, the frequency space data 62 used to construct a tomographic image may be divided into two independent subsets, one set of data is that within the cone 64 and the other set of data is that outside the cone 64. As independent quantities, these can be symbolized in vector notation (vector diagram 66 of FIG. 6)

as two perpendicular vectors $F_i$ and $F_o$ which together form the frequency space data F.

As noted, the effect of the cone beam acquisition and reconstruction is to produce an image based on frequency space data having no component $F_i$, that is, the image is reconstructed solely from components $F_o$. One way of looking at this truncation of the frequency space data F is by modeling the cone beam acquisition and reconstruction process as the addition of new frequency space data $F_a$ of equal and opposite magnitude to component $F_i$ which thus serves to cancel out component $F_i$. As indicated in vector diagram 68 of FIG. 6, this "added" frequency space data $F_a$ represents the source data for the artifacts in the image and if $F_a$ could be identified and removed, the artifacts in the image would also be eliminated.

Figure 7:
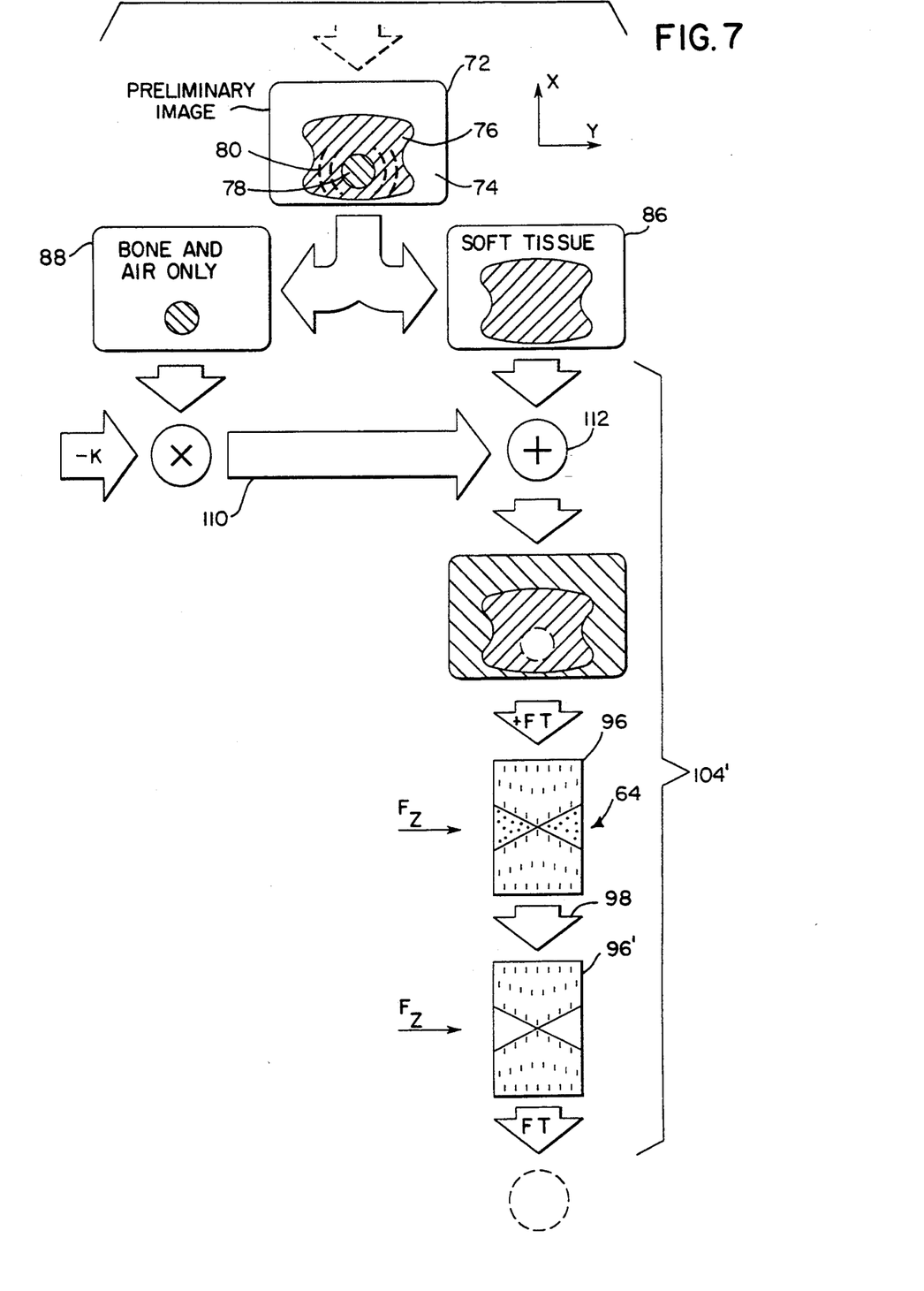
FIG. 7 is a figure similar to FIG. 5 but depicting the modified filtering procedure in which extreme-range data is multiplied by a small negative factor to produce a modified mid-range image which is then filtered in the same manner as depicted in FIG. 5.
Figure 8:
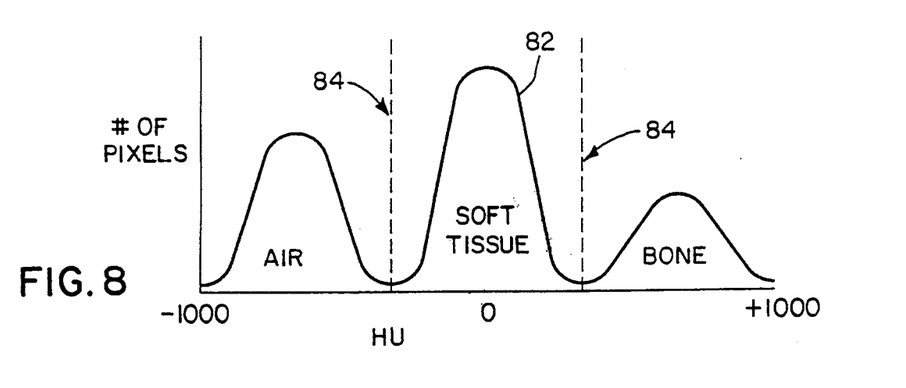
FIG. 8 is a histogram of pixels vs. pixel density for a typical tomographic image of the human body prior to artifact reduction of the present invention showing the groupings of the pixels into distinct ranges of bone, air, and soft tissue.

Referring to FIGS. 5 and 7, each pixel of the preliminary image 72 has an associated density value typically represented in the image as a gray level from white to black. The density for CT machines is typically quantified as Houndsfield units (HU) ranging from +1,000 (white) to −1,000 (black). In images of the human body, the pixels will generally cluster into one of three groupings of air, soft tissue and bone having progressively increasing HU or densities. The divisions between these categories may be readily determined by plotting the density of each pixel of the image against the number of pixels having that value to provide a tri-modal histogram having a central lobe 82 flanked by two minima 84 which define a range of HU corresponding to pixels depicting soft tissue within the body.

Referring still to FIG. 5, by employing the range established by the minima 84, each pixel of the image 72 may be categorized as either soft tissue or non-soft tissue (bone and air). The air of concern is typically that entrained within the lungs or stomach cavity but may also be the air generally surrounding imaged objects. After categorizing each pixel of the preliminary image 72, two selective images 86 and 88 are produced. The first selected image is an image 86 of soft tissue only and the second image is an image 88 of bone and air. The "spaces" in the soft tissue image 86 formerly occupied by bone are "padded" with an average value pixel and the bone and air image 88 is the difference between mid-range 86 and original image 80.

Referring again to FIG. 6 and vector diagrams 90 and 92, the frequency space data underlying the images 86 and 88 may be examined and separated as to data within the cones of missing data 64 and data outside those cones 64. The data inside the cones 64 for the bone and air image 88 is designated $F_{i(b\&a)}$ and the data outside the cones 64 for the bone and air image 88 is designated $F_{o(b\&a)}$. Similarly, the data inside the cones 64 for the soft tissue image 86 is designated $F_{i(t)}$ and the data outside the cones 64 for the soft tissue image 86 is designated $F_{o(t)}$.

Two assumptions about the image object are now made: (1) the image artifacts themselves tend to having densities corresponding to soft tissue and thus are segregated into the soft tissue image 86; and (2) the image artifacts shown in the tissue image are primarily the result of the bone and air pixels of image 88.

Referring to vector diagram 92, this first assumption leads to the conclusion that the frequency space data causing the artifacts will be largely in the frequency space data of the soft tissue image 86. Thus, vector diagram 90 includes no $F_a$ component.

The second assumption leads to the conclusion that for the soft tissue image 86, absent the image artifacts there would be very little data in the cones or that $F_{i(t)}$ is very small compared to $F_{i(b\&a)}$. This follows from the fact that if the patient were solely soft tissue and thus no artifacts were expected, it would follow that the data in the cones 64 was substantially zero. Thus, any in cone data in the frequency space representation of the soft tissue image 86 must be $F_a$ the artifact producing frequency space data.

Referring again to FIG. 5, the soft tissue image 86 is operated on by a Fourier transform 94 to provide frequency space data 96 for the soft tissue image 86. Unlike the frequency space data 62 for the preliminary image 72, the data within the cone 64 for the soft tissue image 86 will not be zero but may be identified primarily as the frequency space data $F_a$ producing the image artifacts 80. Thus, in a first embodiment, artifacts $F_a$ are be reduced by attenuating that data of frequency space data 96 within the cone 64.

Figure 9:
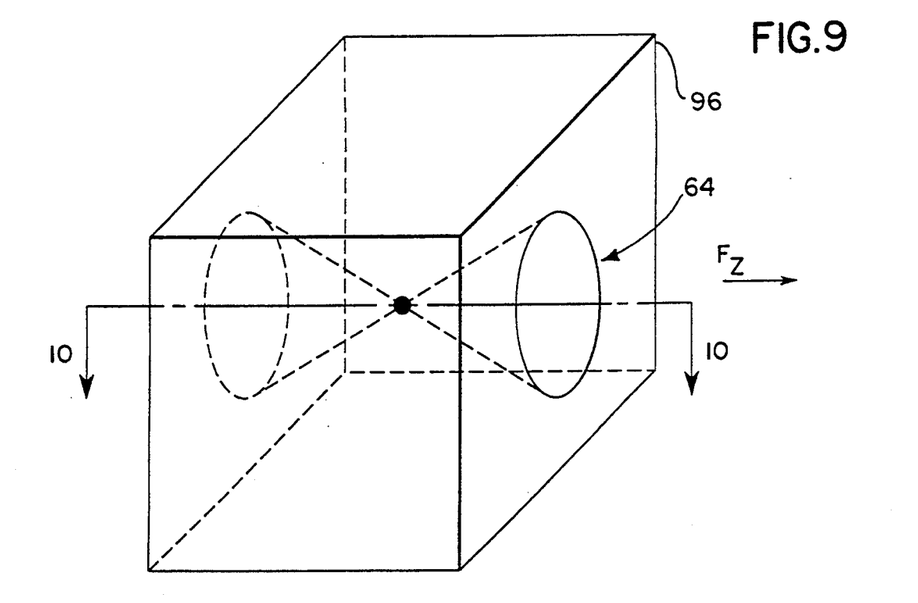
FIG. 9 is a perspective view of frequency space showing conical zones corresponding to the missing data of the projection data set.
Figure 10:
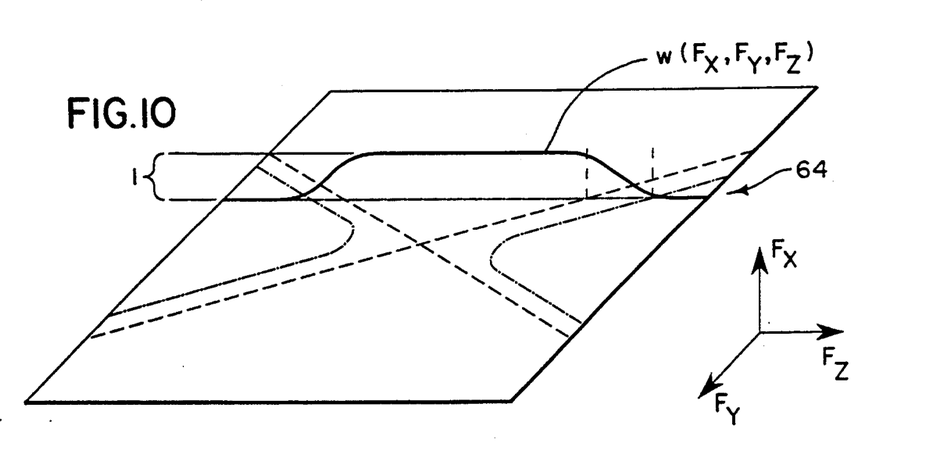
FIG. 10 is a perspective view of a slice of the data of FIG. 9 taken along lines 10—10 having superimposed upon it a weighting functions for filtering of the data within the conical zones of FIG. 9.

Referring now to FIG. 9, the data within the cone 64 of the frequency space 96 of the soft tissue image 86 is preferably reduced by a gradual zeroing process so that data outside the cones 64 is left intact, and not reduced, and so that there is a gradual transition as one moves into the cones 64 where the data is reduced to zero. Referring to FIG. 10, this gradual transition may be simply implemented by a weighting function that effects a low pass filter along the z-axis of frequency space 96 to reduce the contribution of the data within the cones 64. The weighting function W(Fx,Fy, Fz) has a frequency offset depending on Fx and Fy in the frequency space 96 so that the attenuation begins at the boundary of the conical region 64. The weighting function gradually decays to zero within the conical region to accommodate the approximation of the missing data cone 64.

Referring now to FIG. 5, this filtering process 98 acting on the frequency space data 96 of the soft tissue image 86 produces frequency space data 96' having substantially reduced components within cone 64. This modified frequency space data 96' is again transformed using the inverse Fourier transform 70 to produce a revised soft tissue image (not shown) which is added to the bone and air image 88 to produce a new image 100 having reduced image artifacts. The combination is a simple pixel by pixel addition of the bone and air image 88 and the soft tissue image 86 as modified by the filtering process 104 comprising the Fourier transform 94, the filtering process 98 and the inverse Fourier transform 70. The summation is accomplished by adder 102.

Referring to FIG. 6, vector diagram 106 illustrates the vector components of the combined image 100 which includes substantially all of the out of cone frequency data $F_o$ but only the in-cone data $F_{i(b\&a)}$ of the bone and air image 88.

It will be recognized that the filtering of the images above described does not require an actual conversion of the images into frequency space and operation on the frequency space data but that other mathematical techniques such as convolution may be employed to perform the same function in the object space.

Referring now again to FIG. 5 and vector diagram 92, it will be recognized that the filtering process of the data within the cone 64 will attenuate some small amount of non-artifact data $F_{i(t)}$ and thus will not completely eliminate the artifact data $F_a$. For example, for a given element of the frequency space, the component $F_{i(t)}$ may cancel a portion of $F_a$ and thus the filtering of $F_a+F_{i(t)}$ will not completely eliminate $F_a$ at that point. Ideally, the data within the cone 64 of frequency space data 96 for the soft tissue image 86 would not merely be zeroed but would be augmented somehow to ensure the complete elimination of data comprising the artifact spectra $F_a$.

Augmentation of $F_a$ may be accomplished by noting that $F_a$ is approximately equal to $-F_{i(b+a)}$ that is, the in-cone data of the frequency space transformation of the bone and air image 88. The reason for this equivalence is the above assumption that the value of $F_{i(t)}$ is extremely small and that $F_i = -F_a = F_{i(b+a)} + F_{i(t)}$. Accordingly, the amount of image artifact $F_a$ can be estimated from the value $F_{i(b+a)}$.

Referring to FIG. 7, this augmentation is performed by creating an inverse bone and air image 110 by multiplying the pixels of the bone and air image 88 by a negative value, $-k$, between 0 and $-1$. The negation converts $F_{i(b+a)}$ into an approximation of $F_a$. Experimentally, the optimal values of k were determined to be between $-0.25$ and $-0.5$. This negative bone and air image 110 is added by adder 112 on a point by point basis to the soft tissue image 86. As before, the filtering process 104' continues within the Fourier transform 94 of the soft tissue image 86 as modified by the inverse bone and air image 110 to produce a modified image 112 and frequency space data 96'. Also as before, the data within cone 64 is filtered 98 to produce frequency space 96 combined with the bone and air image 88 as described above with respect to FIG. 5.

Many other modifications and variations of the preferred embodiment which will still be within the spirit and scope of the invention will be apparent to those with ordinary skill in the art. For example, the techniques described herein may be applied to other imaging modalities such as SPECT and position emission tomography where the source of cross-plane and in-plane rays is a decaying isotope within the body or "fourth generation" CT scanning where a stationary detector array receives radiation from an orbiting radiation source. In order to apprise the public of the various embodiments that may fall within the scope of the invention, the following claims are made:

We claim:

1. A method of reducing image artifacts in a tomographic image of an imaged object, such artifacts resulting from simultaneous multiple slice acquisitions of projection data, comprising the steps of:
    (a) acquiring a set of projection data at a plurality of angles about an axis through the imaged object, the projection data measuring attenuation along first rays passing through the imaged object perpendicular to the axis, and second rays passing through the imaged object but not perpendicular to the axis, wherein the set of projection data transformed into frequency space has zones of missing frequency space data as a result of the non-perpendicular angle of the second rays;
    (b) reconstructing the projection data to produce a first tomographic image having pixels of varying density;
    (c) separating the first tomographic image into a mid-range density image including pixels having density values within a predetermined range and an extreme-range density image including pixels having density values outside of the predetermined range;
    (d) spatially filtering the mid-range density image to reduce the value of its spatial frequency in frequency zones corresponding to the zones of missing frequency space data of the projection set;
    (e) combining the filtered mid-range density image and the extreme-range density image to create a second tomographic image.

2. A method of claim 1 wherein step (d) of filtering the mid-range density image includes the steps of:
    (i) Fourier transform the mid-range image to produce frequency space data;
    (ii) reducing the magnitude of the frequency space data in the zones corresponding to the zones of missing frequency space data of the projection set;
    (iii) inverse Fourier transform the filtered frequency space data to a filtered mid-range density image.

3. The method of claim 1 wherein the filter of step (d) is a one dimensional low pass filter along the axis.

4. A method of claim 1 wherein the zones corresponding to the zones of missing frequency space data are approximated by a pair of cones touching at their vertices and having their axes aligned with the axis.

5. The method of claim 4 wherein the filtering is such that the frequency space data outside the cones is unfiltered and that a portion of frequency space data in the cones is completely suppressed.

6. The method of claim 1 including the additional steps of:
    producing an inverse extreme-range density image by multiplying the extreme-range density image by a scaling function having a range of 0 to $-1$;
    prior to step (d) adding the inverse extreme-range density image to the mid-range density image.

7. The method of claim 6 wherein the scaling function is a constant value between $-0.25$ and $-0.5$.

8. An apparatus for producing tomographic images of an imaged object from simultaneous multiple slice acquisitions of projection data, the tomographic images having reduced image artifacts the apparatus comprising:
    (a) a two dimensional detector array for rotating about an axis and the imaged object for acquiring projection data measuring attenuation by the imaged object along first rays passing through the imaged object perpendicular to the axis, and second rays passing through the imaged object but not perpendicular to the axis, wherein the set of projection data transformed into frequency space has zones of missing frequency space data as a result of the non-perpendicular angle of the second rays;
    (b) a reconstruction means for reconstructing the projection data to produce a first tomographic image having pixels of varying density;
    (c) a selection means receiving the first tomographic image for dividing the first tomographic image into a mid-range density image including pixels having density values within a predetermined range and an extreme-range density image including pixels having density values outside of the predetermined range;
    (d) a filter receiving the mid-range density image for reducing the value of its spatial frequency in frequency zones corresponding to the zones of missing frequency space data of the projection set to create a filtered mid-range density image;
    (e) a combining means for combining the filtered mid-range density image and the extreme-range density image to create a second tomographic image.

9. The apparatus of claim 8 wherein the filter includes:
   (i) a deconstructing means receiving the mid-range image and converting it to frequency space data;
   (ii) a scaler for reducing the magnitude of the frequency space data in the zones corresponding to the zones of missing frequency space data of the projection set;
   (iii) a reconstructor for reconstructing the filtered frequency space data to a filtered mid-range density image.

10. The apparatus of claim 9 wherein the scaler is a one dimensional low pass filter along the axis.

11. A apparatus of claim 9 wherein the zones corresponding to the zones of missing frequency space data are approximated by a pair of cones touching at their vertices and having their axes aligned with the axis.

12. The apparatus of claim 11 wherein the scaler leaves the frequency space data outside the cones unfiltered and a portion of frequency space data in the cones completely suppressed.

13. The apparatus of claim 8 including:
   an inverter for receiving the extreme-range density image and creating an inverse extreme-range density image by multiplying the extreme-range density image by a scaling function having a range of 0 to $-1$;
   an adder for adding the inverse extreme-range density image to the mid-range density image before the mid-range density image is received by the filter.

14. The apparatus of claim 13 wherein the scaling function is a constant value between $-0.25$ and $-0.5$.

* * * * *